US008934632B2

(12) United States Patent
Cheng et al.

(10) Patent No.: US 8,934,632 B2
(45) Date of Patent: Jan. 13, 2015

(54) SYSTEM AND METHOD FOR DEVICE-TO-DEVICE (D2D) ASSISTED DYNAMIC TRAFFIC CONTROL FOR CELLULAR NETWORKS (71) Applicant: FutureWei Technologies, Inc., Plano, TX (US)

(72) Inventors: Qian Cheng, Aurora, IL (US); Xiang Chen, Lake Zurich, IL (US); Hao Bi, Lake Zurich, IL (US); Jialing Liu, Palatine, IL (US)

(73) Assignee: FutureWei Technologies, Inc., Plano, TX (US)

( * ) Notice: Subject to any disclaimer, the term of this patent is extended or adjusted under 35 U.S.C. 154(b) by 20 days.

(21) Appl. No.: 13/622,245

(22) Filed: Sep. 18, 2012

(65) Prior Publication Data
US 2014/0079218 A1    Mar. 20, 2014

(51) Int. Cl.
*H04K 1/00* (2006.01)
*H04W 12/02* (2009.01)
*H04W 24/00* (2009.01)

(52) U.S. Cl.
CPC .............. *H04W 12/02* (2013.01); *H04W 24/00* (2013.01)
USPC ....................................... 380/270

(58) Field of Classification Search
CPC ..... H04W 12/02; H04W 12/04; H04W 12/06; H04W 24/00
USPC ........ 380/270, 256–257, 247; 726/4; 709/227
See application file for complete search history.

(56) References Cited

U.S. PATENT DOCUMENTS

| 2012/0179789 | A1* | 7/2012 | Griot et al. | 709/220 |
| 2013/0073671 | A1* | 3/2013 | Nagpal et al. | 709/217 |
| 2013/0170398 | A1* | 7/2013 | Kwon | 370/255 |
| 2013/0170414 | A1* | 7/2013 | Kwon | 370/311 |
| 2013/0201954 | A1* | 8/2013 | Gao et al. | 370/329 |
| 2013/0230028 | A1* | 9/2013 | Calcev et al. | 370/336 |

OTHER PUBLICATIONS

Klaus, Doppler, Device-to-Device Communication as an Underlay to LTE-Advanced Network; IEEE, 2009; pp. 42-49.*

* cited by examiner

*Primary Examiner* — Samson Lemma
(74) *Attorney, Agent, or Firm* — Slater & Matsil, L.L.P.

(57) ABSTRACT

Method and apparatus are provided for offloading data from a cellular network via a secondary network. The offloaded data may be transported over a connection existing independently from the cellular network, such as a direct device-to-device (D2D) or direct mobile communications (DMC) link. The connection may be established between a first peer mobile device and a benefactor peer mobile device, and the benefactor peer mobile device may relay the data to/from a backhaul network via the secondary network. The benefactor peer mobile device may receive compensation for offloading the traffic, and may compete with one or more candidate benefactor devices for the task of offloading the data. The offloaded data may be uplink data originating from the beneficiary peer mobile, or downlink data destined for the beneficiary peer mobile.

20 Claims, 5 Drawing Sheets

SYSTEM AND METHOD FOR DEVICE-TO-DEVICE (D2D) ASSISTED DYNAMIC TRAFFIC CONTROL FOR CELLULAR NETWORKS

TECHNICAL FIELD

The present invention relates generally to a method and system for D2D assisted dynamic traffic control for cellular networks.

BACKGROUND

A significant design consideration for present-day cellular networks is providing high data-rates to wireless users, referred to herein as user equipments (UEs). Specifically, data rates depend on various factors, including channel characteristics (e.g., channel capacity, etc.), channel conditions (e.g., path loss, fading, shadowing, etc.), power control settings, etc. Accordingly, UEs within the same cellular region may experience significantly different data-rates based on, for instance, their proximity to a serving base station (eNB), the level of interference experienced from nearby UEs in the same or neighboring cellular coverage areas, etc.

UEs having poor uplink/downlink connections may require higher transmission power levels (or more uplink/downlink bandwidth, or more transmission time) to maintain adequate throughput, which may (amongst other things) cause greater levels of interference amongst neighboring UEs and/or cause the suboptimal utilization of bandwidth/network resources. In some instances, a high cost connection may be so poor that adequate or desirable data rates are either impossible or impractical (e.g., would require too many network resources or cause excessive interference). A high cost connection may be a connection that requires considerable network resources per throughput (e.g., a high bandwidth to throughput ratio), or a connection that is incapable of providing a desired connection speed or throughput capacity. Threshold values can be established that define when the cost associated with a connection becomes excessive (i.e., becomes a "high cost" connection). As such, techniques and methods for providing higher data rates to UEs with high cost connections are desired.

SUMMARY OF THE INVENTION

Technical advantages are generally achieved, by preferred embodiments of the present invention which describe techniques and methods for achieving D2D assisted dynamic traffic control in cellular networks.

In accordance with an embodiment, a method for operating a first peer mobile device in a cellular network is provided. This example method comprises offloading data from a cellular network by communicating data originally intended for transmission over a cellular connection over a direct device-to-device (D2D) or direct mobile communications (DMC) link. In embodiments, the method may further include negotiating with one or more potential benefactors (e.g., peer mobile devices facilitating the offloading of the data from the cellular network) a rate to be paid for offloading the data. The D2D or DMC link may be established between the first peer mobile device and a second peer mobile device. An apparatus for performing this method is also provided.

In accordance with another embodiment, a method for operating a benefactor peer mobile device is provided. In this example, the method includes agreeing to offload a portion of data associated with a beneficiary peer mobile device from a cellular network, and then transporting that portion of data over a direct connection extending between the benefactor peer mobile device and the beneficiary peer mobile device. In some embodiments, the offloaded data may be uplink data (e.g., data transmitted from the beneficiary peer mobile), and the data may be relayed to a backhaul network via a secondary network that is not the cellular network. In other embodiments, the offloaded data may be downlink data (e.g., data transmitted to the beneficiary peer mobile), and the data may be relayed from a backhaul network via a secondary network that is not the cellular network. An apparatus for performing this method is also provided.

In accordance with yet another embodiment, a method for operating a base station in a cellular network is provided. In this example, the method includes authorizing or acknowledging the offloading of a portion of data from the cellular network. In an embodiment, the portion of the data may be transported over a direct connection between a first peer mobile device and a second peer mobile device. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
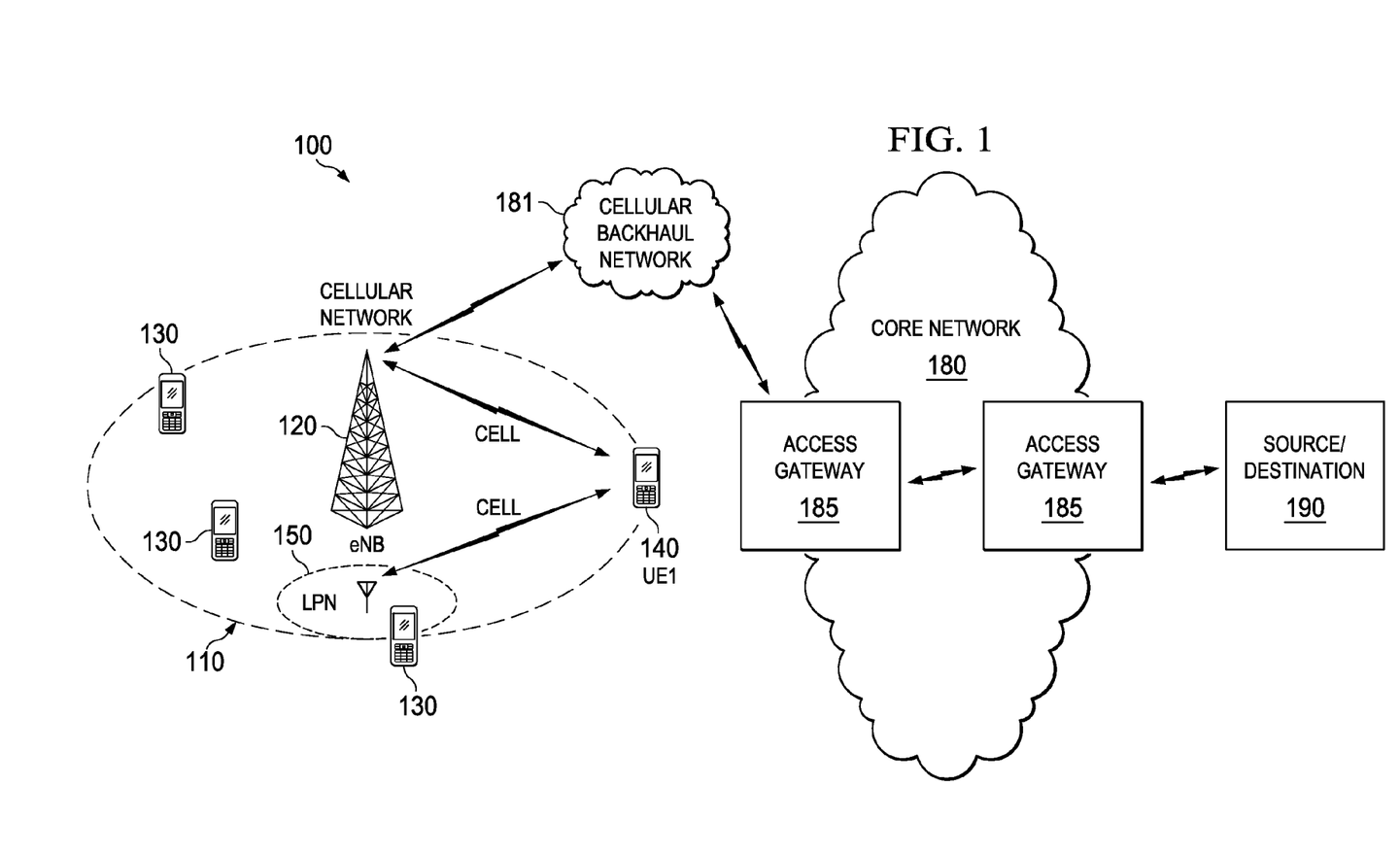
FIG. 1 illustrates a network architecture for providing cellular communication via a cellular network.

FIG. 1 illustrates a network architecture 100 for providing cellular communication via a cellular network corresponding to and/or including the cellular coverage area 110. The network architecture 100 may comprise the cellular coverage area 110, a core/backhaul network 180, cellular backhaul network 181, and a source/destination 190. The cellular coverage area 110 may be serviced by a base station (such as a 3GPP-compliant eNB) 120, which may provide cellular service to a plurality of UEs 130-140. The cellular coverage area 110 may also have one or more low-power nodes (LPNs) 150, which may be capable of providing wireless coverage to one or more of the UEs 130-140. The LPN 150 may be any component capable of engaging in more localized communications, including home base stations (HeNBs), picocells, relay nodes, remote radio heads (RRHs), access points (APs), component carriers/frequencies, femtocells, near-field communication, or other devices for providing localized cellular access. In some embodiments, the eNB 120 may be referred to as a "macrocell", and the LPN 150 may be referred to as a "picocell." The core network 180 may be the central part of the network architecture 100, and may provide services to the cellular coverage area 110 (which may behave as an access network for the UEs 130-140) and/or the source/destination 190 via one or more access gateways 185. In some embodiments, the cellular network may interact with the core network 180 directly. In other embodiments, the cellular network may interact with the core network 180 via a cellular backhaul network 181. The source/destination 190 may be another access network connected to the core network 180.

The UE 140 may want to send/receive data to/from the source/destination 190, and may establish a cellular connection with the eNB 120 for that purpose. As used herein, the term "data" includes, but is not limited to, packet data, multimedia content, streaming multimedia, and packetized voice traffic. When a parameter associated with communicating data over the cellular connection fails to meet a criteria (e.g., throughput fails to exceed a threshold value), the cellular connection cellular connection may be deemed a "high cost" or "low grade" connection (e.g., a slow connection whose available throughput does not support an adequate or desirable data-rate). In the event that the cellular connection is deemed a high cost connection, the UE 140 may attempt to establish a high-data rate connection with the LPN 150. However, due to capacity and/or connection quality reasons and/or connection restriction (e.g., LPN 150 forms a closed-subscription group ("CSG"), LPN's 150 transmission power is low, the pathloss to between the UE 140 and the LPN 150 is high, etc.), the LPN 150 may also be unable to provide a high-data rate connection to the UE 140. In some instances, UE 140 may not find any adequate available cellular network resource to utilize in its reach since generally the network infrastructure is pre-deployed and may be far from UE 140; therefore, there may be no means for the cellular network to provide the desired level of service to UE 140. As such, providing some avenue for the UE 140 to offload its data from the cellular network (e.g., the cellular coverage area 110) is desired, and in certain circumstances, may be the only viable solution.

Figure 2:
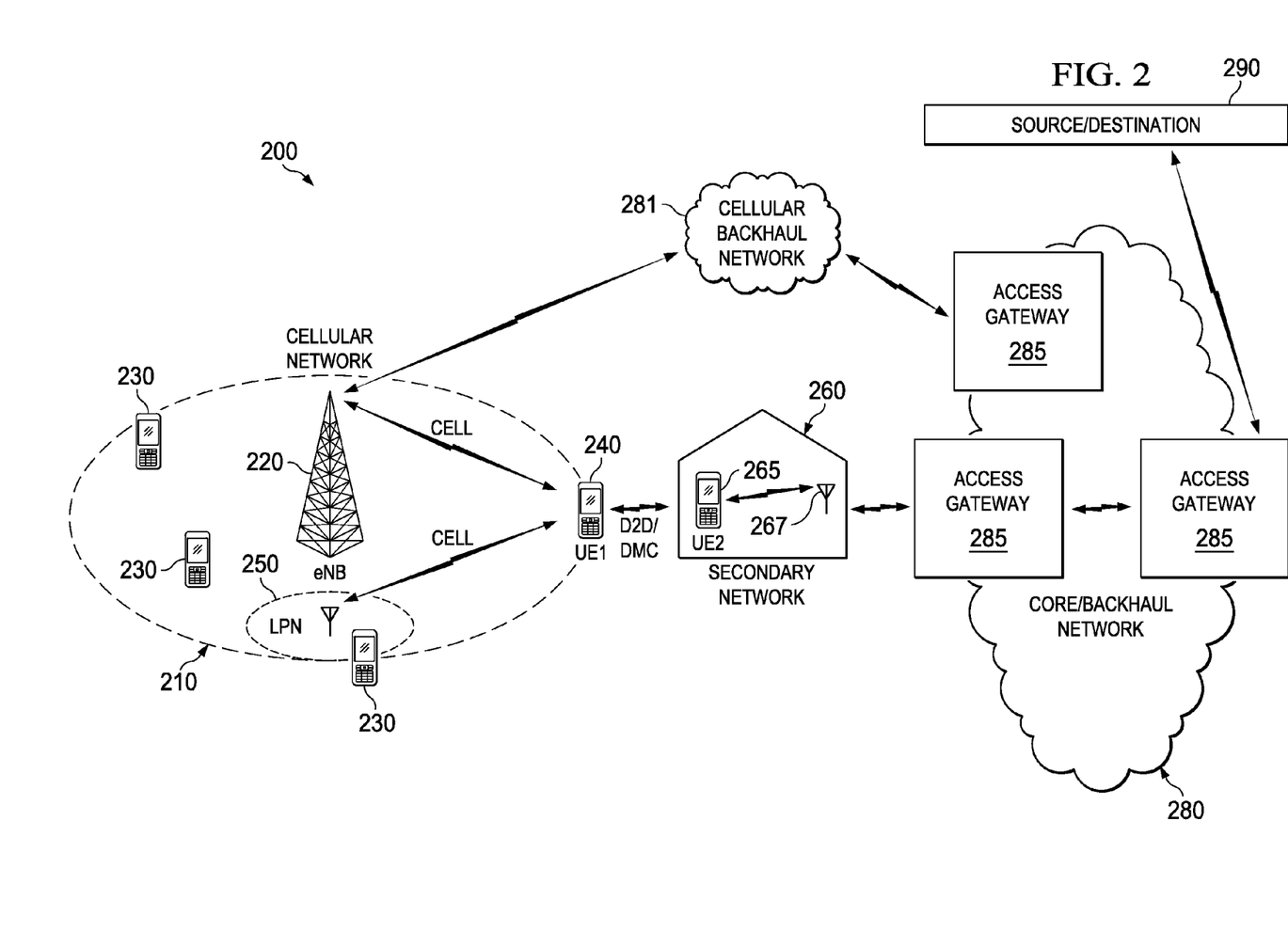
FIG. 2 illustrates an embodiment of a network architecture for offloading data from a cellular network.

FIG. 2 illustrates an embodiment of a network architecture 200 for offloading data from a cellular network corresponding to the cellular coverage region 210. The embodiment depicted in FIG. 2 (as well as other embodiments of this disclosure) may be used to offload uplink data and/or downlink data from the cellular network. The network architecture 200 may comprise the cellular coverage area 210, a secondary network 260, a core/backhaul network 280, a cellular backhaul network 281, and a source/destination 290. The cellular coverage area 210 may be configured somewhat similarly to the cellular coverage area 110, and may include an eNB 220, a plurality of UEs 230, a beneficiary UE 240, and an LPN 250.

The secondary network 260 may be any network or collection of components that allow the beneficiary UE 240 to offload data from the cellular network. For instance, the secondary network 260 may be a public, private, or semi-private network that is operated by the same or different administrator as the cellular network. Notably, the secondary network 260 and the cellular network (e.g., corresponding to the cellular coverage area 210) may not share resources, and consequently transporting data over the secondary network (rather than over the cellular network) may effectively offload at least a portion of data from the cellular network.

The secondary network 260 may comprise a benefactor UE 265 and an access point (AP) 267. The benefactor UE 265 may be any peer mobile device that is capable of establishing a communication link directly with the beneficiary UE 240 for the purpose of offloading traffic from the cellular network. The communication link between the beneficiary UE 240 and the benefactor UE 265 may be a direct mobile connection (DMC), a device-to-device (D2D) connection, or any other connection that allows the beneficiary UE 240 and the benefactor UE 265 to communicate directly.

The AP 267 may be any component or collection of components that allows the beneficiary UE 240 to communicate with the core/backhaul network 280 or components thereof (such as the access gateway 285). In some embodiments, the AP 267 may not be directly accessible by the UE 240, e.g., if the secondary network 260 is a private WiFi network that is only accessible with a passcode. In such embodiments, the UE 240 may connect directly to the AP 267 or (alternatively) the UE 240 may connect indirectly to the AP 267 via the benefactor UE 265. When the UE 240 connects to the AP 267 via the UE 265, the UE 265 may behave as an access point, allowing the UE 240 to access the secondary network 260. In some embodiments, the AP 267 may be directly accessible by the UE 240, but circumstances may prevent the UE 240 from establishing a hi-speed connection with the secondary network 260. For instance, the AP 267 may have a limited coverage area (e.g., about 20 meters), low transmission power level (e.g., 20 dBm), and the UE 265 may act as a relay to the secondary network 260. In other embodiments, the UE 240 may simply not recognize the AP 267.

In any event, the ability to offload data via the D2D/DMC link connection may be beneficial as accessing stationary/pre-deployed access points (e.g., the AP 267) may be more cumbersome than establishing direct D2D or DMC links with other peer mobile devices (e.g., the benefactor UE 265), which are likely to be more abundant than stationary/pre-deployed access points. Hence, the UE 240 may be more likely to identify and/or establish a hi-speed connection with other peer mobile devices (e.g., the benefactor UE 265), than stationary access points (e.g., the AP 267). Thus, offloading data in the manner described herein may introduce flexibility into the network by providing network resources via UEs, as well as by expanding network coverage and topology in a dynamic manner.

The beneficiary UE 240 may offload data via the secondary network 260 after determining that the cellular connection is incapable of supporting an adequate or desired data-rate, or after determining the existence of a lower cost connection (e.g., the D2D or DMC link). Specifically, the beneficiary UE 240 and the benefactor UE 265 may establish a connection or link (e.g., a DMC or D2D link), over which a portion (or all) of the data may be transported. In some embodiments, the UE 265 may relay offloaded uplink data from the UE 240 to an access gateway 285. In other embodiments, the UE 265 may relay offloaded downlink data from the access gateway 285 to the UE 240. The offloaded data may be relayed to/from the backhaul network via the same or different access gateway as would have otherwise been used by the eNB 220 and/or the LPN 230. Hence, the beneficiary UE 240 may bypass the cellular network by offloading the data using the secondary network 260.

Figure 3:
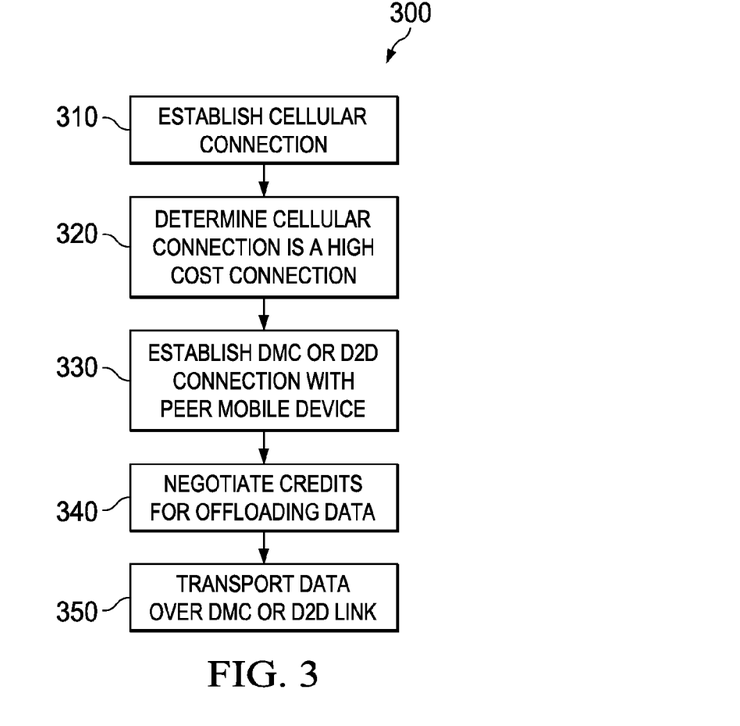
FIG. 3 illustrates a block diagram of an embodiment of a method for offloading data from a cellular network.

FIG. 3 illustrates an embodiment of a method 300 for offloading data from a cellular network. The method may begin at step 310, where a cellular connection may be created between a UE and an eNB. Next, the method may proceed to step 320, where the UE or the eNB may determine that the cellular connection is a high cost connection, or otherwise that the cellular connection has a higher cost than potential of existing DMC or D2D connections. For instance, the UE or eNB may determine that the cellular connection is incapable of providing the desired data rate, or that offloading the data from the cellular network would better optimize the available resources. That is to say, if the offloading has lower cost than cellular connection, the offloading may be beneficial and/or desirable. The cost of the cellular and/or direct connection may be computed in various ways. For example, the cost may correspond to a pathloss, a Reference Signal Received Power (RSRP), a Reference Signal Received Quality (RSRQ), a spectral efficiency, a data rate (bits/second), a priority, an estimated total time for data transfer, an energy cost (joules/bit), a network expense (cents/bit), etc. Ultimately, a benefactor UE may be chosen to offload the traffic if it minimizes or reduces a cost function, maximizes or increases a utility function, or both.

Subsequently, the method may proceed to step 330, where the UE may establish a direct connection (e.g., a DMC or D2D connection) with a peer mobile device. Next, the method 300 may proceed to step 340, where the peer mobile device (e.g., a benefactor UE) may negotiate appropriate consideration (if not previously arranged), such as a number of credits or other suitable compensation (monetary, reciprocity, reciprocity priority, etc.) to be provided for offloading the data. In some embodiments, the peer mobile device may negotiate with the eNB. In other embodiments, the peer mobile device may negotiate with the UE offloading the data (e.g., the beneficiary UE), the base station, or the service provider. The number of credits may be any form of compensation, such as mobile minutes, currency, bandwidth, priority of service, or other forms of compensation that serve to incentivize the benefactor UE to offload the data from the cellular network. The steps 330 and 340 may occur simultaneously, or in a reverse order, in various embodiments. After a rate is agreed upon, the data may be transported over the DMC or D2D link in step 350, thereby offloading the data from the cellular network.

Figure 4:
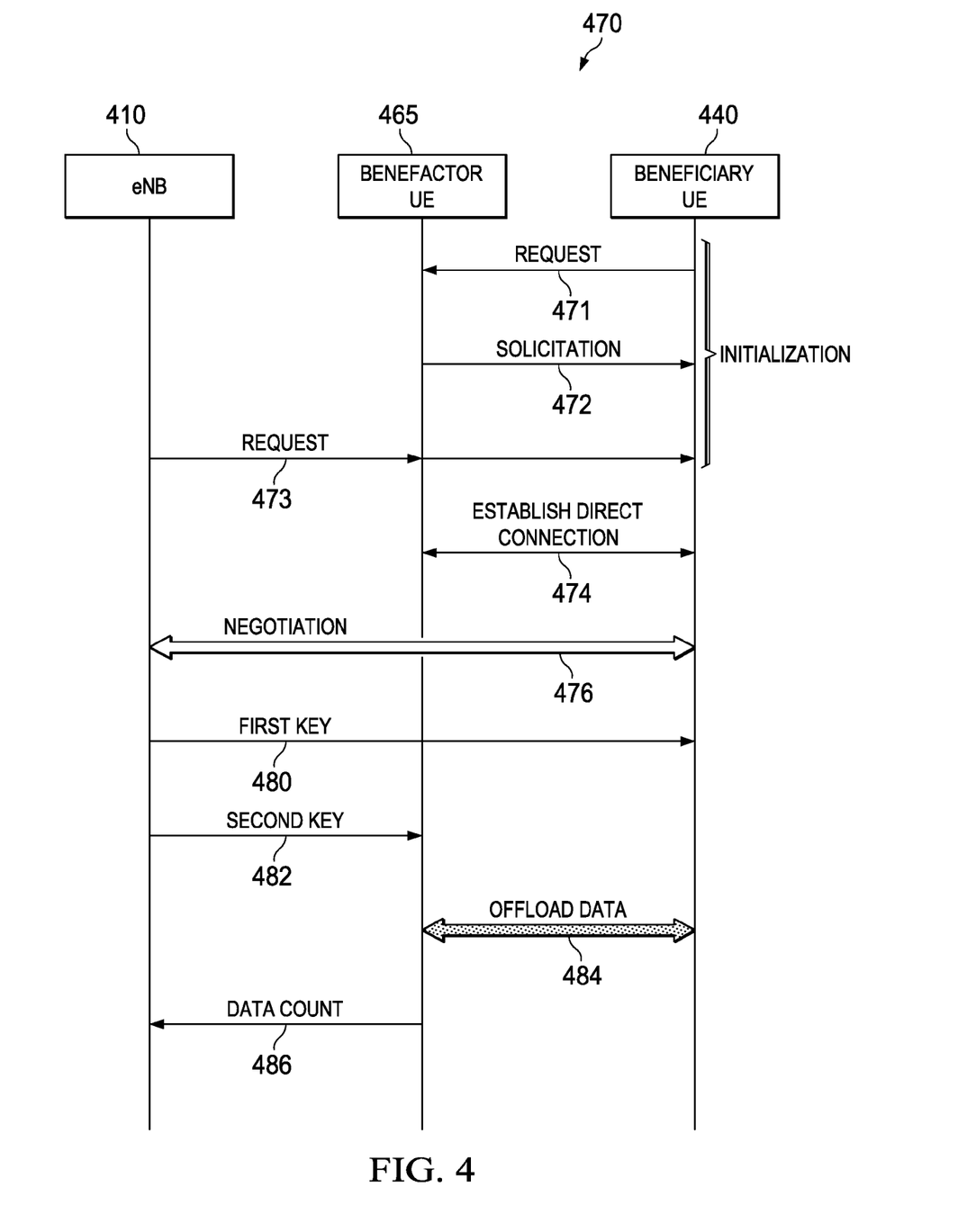
FIG. 4 illustrates a diagram of an embodiment of a protocol for offloading data from a cellular network.

FIG. 4 illustrates an embodiment of a protocol 470 for offloading data from a cellular network. The protocol may take place between an eNB 410, a beneficiary UE 440, and a benefactor UE 465, which may be configured somewhat similarly to the eNB 210, the beneficiary UE 240, and the benefactor UE 265 of FIG. 2. The protocol 470 may begin with the broadcast of either a request 471 or a solicitation 472. The request 471 may be broadcast when the beneficiary UE 440 is the initiating party, while the solicitation 472 may be broadcast when the benefactor UE 465 is the initiating party. In some embodiments, the request 471 may be broadcast in response to receiving the solicitation 472. The request 471 may include various parameters or information, including an amount of traffic to be offloaded, a Quality of Service (QoS) required for the offloaded traffic, a credit offered to offload the request, or combinations thereof. In other embodiments, the eNB 410 may send a request 473 to one or both of the beneficiary UE 440 and the benefactor UE 465 to initialize the offloading procedure.

The nature and/or amount of credits provided as compensation for offloading the traffic may depend upon a variety of factors, including the urgency or relative need of the eNB to offload the traffic, the condition of the cellular connection, the QoS required, the amount of data, events occurring in vicinity of the user, time of day, etc. In some embodiments, the solicitor (e.g., potential benefactor) may announce or suggest an amount of credits or credit rate, which may be affected by various factors, such as the quality of the D2D or DMC link connection, power consumption and/or availability (e.g., battery powered devices may demand more than devices connected to a grid), backhaul quality (such as backhaul connection speed, bandwidth, congestion condition), backhaul costs, whether the benefactor device is idling or busy, etc. For example, benefactor devices that are idling/charging may announce lower credit rates than devices that are busy or on battery, as offloading traffic may be less cumbersome for such devices.

After initialization, the beneficiary UE 440 and the benefactor UE 465 may exchange one or more messages 474 (e.g., response, initiation, etc.) to establish the direct connection (e.g., the DMC or D2D connection). Next, the benefactor UE 465 may exchange messages 476 with one or both of the eNB 410 or the beneficiary UE 440 to negotiate credits for offloading the data from the cellular network. In some embodiments, the negotiation (i.e., exchanging the messages 476) may occur prior to establishing the direct connection (i.e., exchanging the messages 474).

Once an agreement has been reached, the eNB 410 may transmit a first key 480 to the beneficiary UE 440, as well as a second key 485 to the benefactor UE 465. The beneficiary UE 440 may use the first key to encrypt a data count, which may be sent to the benefactor UE 465 over the DMC or D2D connection. If uplink data is being offloaded, then the data count may be appended to one or more packets containing the data prior to transmitting the packets over the DMC or D2D connection. If downlink data is being offloaded, the data count may be transmitted independently over the DMC or D2D connection (or appended to some other data or message that is communicated over the DMC or D2D connection). The data count may specify an amount of data (e.g., # of packets, bytes, etc.) that is offloaded from the network over the DMC or D2D connection. The benefactor UE 465 may use the second key to decrypt the data count, thereby verifying that the amount of data specified in the data count by the beneficiary UE 440 is correct. The benefactor UE 465 may forward one or more of the encrypted data counts to the eNB 410 in order to receive compensation (e.g., to receive the credits). However, the second key may not allow the benefactor UE 465 to re-encrypt the data count, and consequently the benefactor UE 465 may be incapable of manipulating the data count to, e.g., exaggerate the amount of data that is offloaded from the network.

In some embodiments, the benefactor UE 465 may notice a discrepancy between the data count and the amount of data received/forwarded over the direct link. In the same or other embodiments, the beneficiary UE 440 and/or the cellular network provider may notice a discrepancy between the service quality promised by the benefactor UE and the service quality actually provided by the benefactor UE. Hence, one of the beneficiary UE, the benefactor UE, or the cellular network provider may initiate a resolution procedure. For instance, the benefactor UE 465 may communicate said discrepancy to the beneficiary UE 440 and request the correction. In response, two or more of the eNB 410, the beneficiary UE 440, and the benefactor UE 465 may engage in a resolution procedure to identify the correct quantity of data communicated over the DMC or D2D connection.

Figure 5:
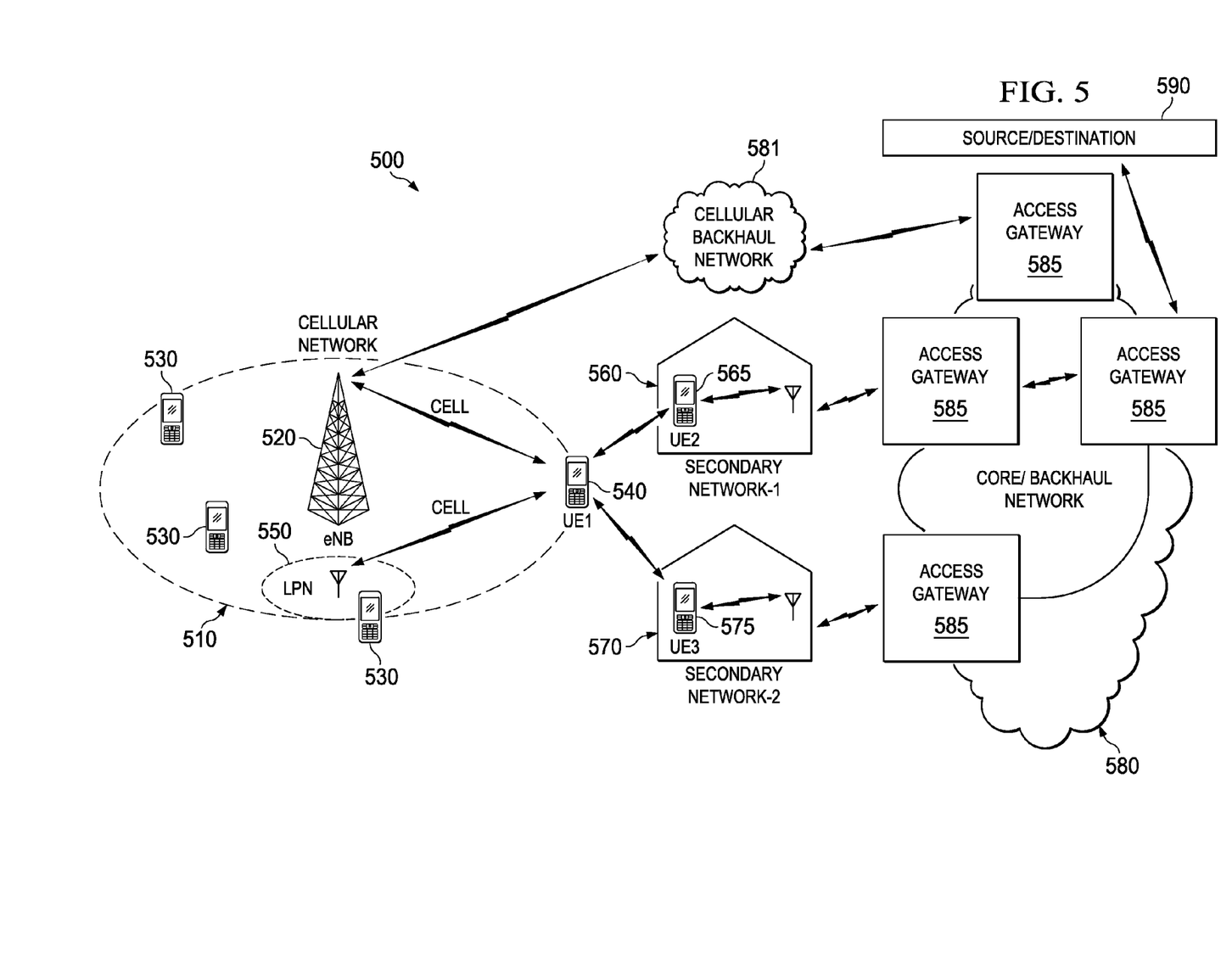
FIG. 5 illustrates another embodiment of a network architecture for offloading data from a cellular network.

In some implementations or scenarios, there may be a competitive process for determining who will be the benefactor UE (e.g., who will receive the credits for offloading the data). FIG. 5 illustrates an embodiment of a network architecture 500 for offloading data from a cellular network (e.g., as represented by a cellular coverage region 510). The network architecture 500 may comprise the cellular coverage area 510, a plurality of secondary networks 560-570, a core/backhaul network 580, and a source/destination 590. The cellular coverage area 510 may be configured somewhat similarly to the cellular coverage area 110, and may include an eNB 520, a plurality of UEs 530, a beneficiary UE 540, and an LPN 550. The secondary networks 560-570 may be configured similarly to the secondary network 260, and may be capable of offloading traffic from the cellular network corresponding to the cellular coverage area 510.

The secondary network 560 may comprise a potential benefactor UE 565, while the secondary network 570 may comprise a potential benefactor UE 575. In some embodiments, the potential benefactor UE 565 and the potential benefactor UE 575 may compete to offload data from the beneficiary UE 540. For instance, the beneficiary UE 540 may choose to offload the data to the potential benefactor that offers the best rate (e.g., lowest credits), provides the highest QoS, link quality, low latency, etc. In some embodiments, the beneficiary UE 540 may simply choose the potential benefactor that offers the lowest cost (e.g., lowest path loss) connection. In some embodiments, the potential benefactor's cost may have already discounted various factors such as the advertised QoS, link quality, etc. As such, the cost may not be a cost depending on only one factor (or even a combination of factors), but rather an overall/aggregated cost. Hence, and the beneficiary UE 540 may simply choose the potential benefactor that offers the lowest overall cost, which may simplify the selection process for the beneficiary UE and/or the cellular network. In other embodiments, the APs in the secondary networks 560 and 570 may be accessed directly by the UE 540, and hence the APs may negotiate directly with the UE 540 and/or the cellular network.

Figure 6:
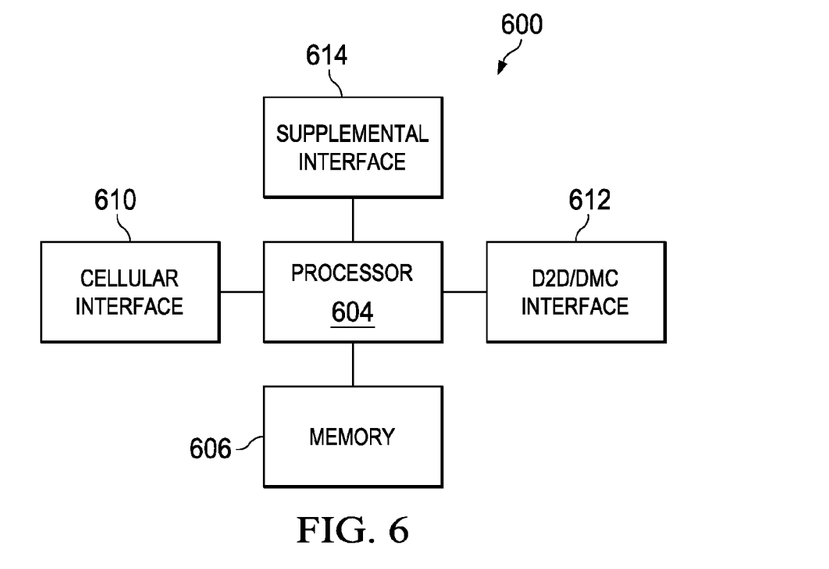
FIG. 6 illustrates a block diagram of an embodiment of a mobile device.

FIG. 6 illustrates a block diagram of an embodiment of a mobile device 600. The mobile device 600 may include a processor 604, a memory 606, a cellular interface 610, a D2D/DMC interface 612, and a supplemental interface 614, which may (or may not) be arranged as shown in FIG. 6. The processor 604 may be any component capable of performing computations and/or other processing related tasks, and the memory 606 may be any component capable of storing programming and/or instructions for the processor 604. The cellular interface 610 may be any component or collection of components that allows the mobile device 600 to communicate using a cellular signal, and may be used to receive and/or transmit information over a cellular connection of a cellular network. The D2D/DMC interface 612 may be any component or collection of components that allows the mobile device 600 to communicate directly with peer mobile devices (e.g., benefactor/beneficiary UEs), and may be used to offload data from a cellular network. The supplemental interface 614 may be any component or collection of components that allows the mobile device 600 to communicate via a supplemental protocol, such as a Wi-Fi or Bluetooth protocol, or a control protocol. The supplementary interface 614 may be used for various administrative and/or other functions.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a first peer mobile device in a cellular network, the method comprising:
   communicating, by the first peer mobile device, a first portion of data to a backhaul network via a cellular connection;
   determining whether a parameter associated with communicating data over the cellular connection fails to satisfy a first criteria; and
   in instances where the parameter associated with communicating data over the cellular connection fails to satisfy the first criteria, communicating a second portion of data over a first direct connection extending between the first peer mobile device and a second peer mobile device, thereby offloading the second portion of data from the cellular connection to the first direct connection, wherein the second peer mobile device forwards the second portion of data to the backhaul network.

2. The method of claim 1, wherein the second portion of data is relayed between the first mobile device and the backhaul network via a secondary network that is different from the cellular network.

3. The method of claim 1, wherein the first direct connection formed between the first peer mobile device and the second peer mobile device is a device-to-device (D2D) connection.

4. The method of claim 1, wherein the first direct connection formed between the first peer mobile device and the second peer mobile device is a direct mobile communications (DMC) connection.

5. The method of claim 1 further comprising:
   identifying the first direct connection and a second direct connection as candidates for offloading the second portion of data, the second direct connection extending between the first peer mobile device and a third peer mobile device; and
   deciding to offload the second portion of data over the first direct connection, rather than over the second direct connection, in accordance with a second criteria.

6. The method of claim 5, wherein the second criteria includes competitive bids from each of the first peer mobile device and the second peer mobile device.

7. A method for operating a first peer mobile device in a cellular network, the method comprising:
   communicating, by the first peer mobile device, a first portion of data to a backhaul network via a cellular connection;
   determining whether a parameter associated with communicating data over the cellular connection fails to satisfy a first criteria;
   in instances where the parameter associated with communicating data over the cellular connection fails to satisfy the first criteria, communicating a second portion of data over a first direct connection extending between the first peer mobile device and a second peer mobile device, wherein the second peer mobile device relays the second portion of data between the first mobile device and the backhaul network;

receiving, by the first peer mobile device, a first key from a base station with which the cellular connection is established;

encrypting a data count using the first key, the encrypted data count specifying an amount of data communicated over the first direct connection by the first peer mobile device; and transmitting the encrypted data count to the second peer mobile device via the first direct connection.

8. The method of claim 7, wherein the first key is distributed to the first peer mobile device without being distributed to the second peer mobile device, thereby allowing the first peer mobile device to set the amount of data specified by the encrypted data count while preventing the second peer mobile device from manipulating the amount of data specified by the encrypted data count.

9. The method of claim 8, wherein a second key is distributed to the second peer mobile device, and wherein the second key is operable for decrypting the encrypted data count to verify the amount of data specified by the encrypted data count, but is inoperable for re-encrypting the data count.

10. A first peer mobile device comprising:

a processor; and a non-transitory computer readable storage medium storing programming for execution by the processor, the programming including instructions to:

determine whether a parameter for transporting data over a cellular connection fails to satisfy a first criteria, the cellular connection established over a cellular network and extending between the first peer mobile device and a backhaul network; and responsive to determining that the parameter associated with communicating data over the cellular connection fails to satisfy the first criteria, establish a first direct connection between the first peer mobile device and a second peer mobile device, and communicate a portion of data over the first direct connection, thereby offloading the portion of data from the cellular connection to the first direct connection, wherein the second peer mobile device forwards the portion of data to the backhaul network.

11. The first peer mobile device of claim 10, wherein the first direct connection between the first peer mobile device and the second peer mobile device is a device-to-device (D2D) connection.

12. The first peer mobile device of claim 10, wherein the first direct connection between the first peer mobile device and the second peer mobile device is a direct mobile communications (DMC) connection.

13. The first peer mobile device of claim 10, wherein the portion of data is relayed between the first mobile device and the backhaul network via a secondary network that is different from the cellular network.

14. The first peer mobile device of claim 10, wherein the programming further includes instructions to:

identify the first direct connection and a second direct connection as candidates for offloading the portion of data, the second direct connection extending between the first peer mobile device and a third peer mobile device; and offload the portion of data over the first direct connection, rather than over the second direct connection, in accordance with a second criteria.

15. The first peer mobile device of claim 14, wherein the second criteria includes competitive bids from each of the first peer mobile device and the second peer mobile device.

16. The first peer mobile device of claim 10, wherein the programming further includes instructions to:

receive a first key from a base station with which the cellular connection is established;

encrypt a data count using the first key, the encrypted data count specifying an amount of data communicated over the first direct connection by the first peer mobile device; and transmit the encrypted data count to the second peer mobile device via the first direct connection.

17. The first peer mobile device of claim 16, wherein the first key is distributed to the first peer mobile device without being distributed to the second peer mobile device.

18. The first peer mobile device of claim 17, wherein the first key is distributed to the first peer mobile device to allow the first peer mobile device to set the amount of data specified by the encrypted data count, and wherein the first key is not distributed to the second peer mobile device to prevent the second peer mobile device from manipulating the amount of data specified by the encrypted data count.

19. The first peer mobile device of claim 18, wherein a second key is distributed to the second peer mobile device, and wherein the second key is operable for decrypting the encrypted data count to verify the amount of data specified by the encrypted data count.

20. The first peer mobile device of claim 19, wherein the second key is inoperable for re-encrypting the data count.

* * * * *